ated together at their margins. The form shown in Fig. 3 is made by assembling together two similar channel members 2—2, along with a third dissimilar interior channel member 3, and welding them at their margins.

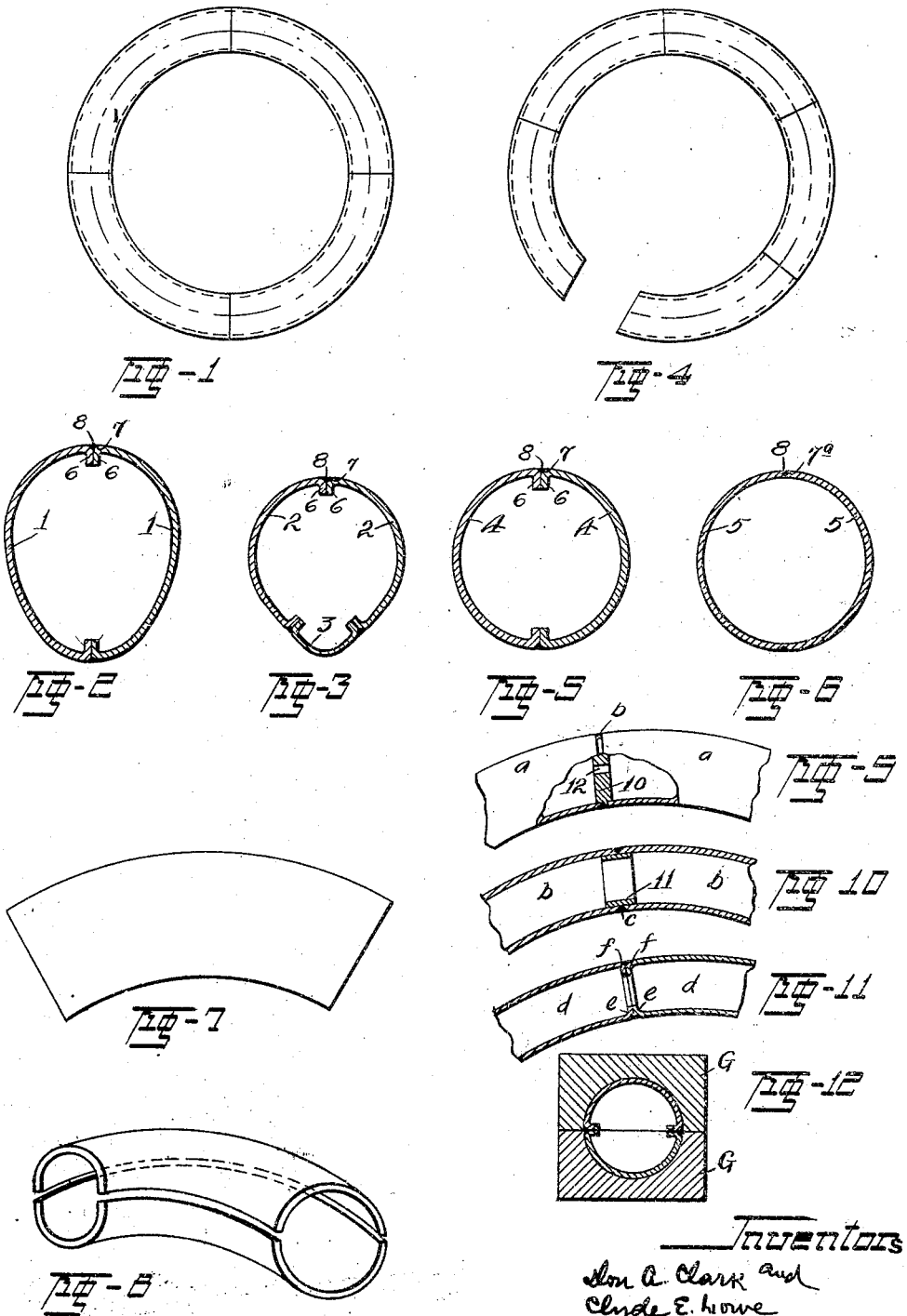

UNITED STATES PATENT OFFICE.

DON A. CLARK AND CLYDE E. LOWE, OF CLEVELAND, OHIO, ASSIGNORS TO THE CLYDE E. LOWE COMPANY, OF CLEVELAND, OHIO, A CORPORATION OF OHIO.

MANDREL FOR PNEUMATIC-TIRE MANUFACTURE.

1,316,276.     Specification of Letters Patent.     Patented Sept. 16, 1919.

Application filed March 7, 1919. Serial No. 281,283.

*To all whom it may concern:*

Be it known that we, DON A. CLARK and CLYDE E. LOWE, citizens of the United States, residing at Cleveland, in the county of Cuyahoga and State of Ohio, have invented a certain new and useful Improvement in Mandrels for Pneumatic-Tire Manufacture, of which the following is a full, clear, and exact description, reference being had to the accompanying drawings.

This invention relates to mandrels or forms for use in making certain parts of pneumatic tires, such as inner tubes and liners. Such devices heretofore have been made of cast metal which offers the disadvantages of excessive weight, expensive machining and high heat capacity. The object of our invention is the provision of a new article of manufacture, namely a mandrel of sheet metal, which avoids all such disadvantages.

In the drawings accompanying and forming a part of this specification we have illustrated certain mechanical forms in which our invention may be embodied, although it will be understood that these constitute only a few of the many mechanical structures by means of which our invention can be utilized. In these drawings Figure 1 is a plan view of a complete reliner mandrel; Fig. 2 is a sectional view thereof; Fig. 3 is a sectional view of a modified type of reliner mandrel; Fig. 4 is a plan view of a tube mandrel; Fig. 5 is a sectional view thereof; Fig. 6 is a sectional view of a modified form of mandrel; Fig. 7 is a plan view of the blank used in making any one of the same; Fig. 8 is a perspective view of the parts of a body prior to welding the same; Figs. 9, 10, and 11 illustrate various methods of welding together and reinforcing the abutting ends of these bodies; and Fig. 12 is a sectional view of the finishing dies with one of our improved mandrels therein.

A reliner mandrel is made of a complete circular form owing to the fact that a reliner is a continuous body, removal from the core being possible because of the fact that it is longitudinally slit around its smallest periphery. It is also somewhat oval in cross section as shown in Figs. 2 and 3, the form shown in Fig. 2 being made by assembling together two similar arcuate channel members 1—1 each of which subtends 180° of the transverse circumference, and welding them together at their margins. The form shown in Fig. 3 is made by assembling together two similar channel members 2—2, along with a third dissimilar interior channel member 3, and welding them at their margins.

The tube mandrel of the type shown in Fig. 4 is generally circular in transverse section, and is discontinuous, owing to the fact that the tubes are made without longitudinal slit or seam and are withdrawn endwise. This mandrel, like the previous one, is made by securing endwise together a plurality of hollow bodies, each of which is formed of a plurality of arcuate channel members 4—4 or 5—5 and welding them longitudinally at their margins.

Fig. 7 illustrates a blank capable of making any one of the channel pieces 1, 2, 4, or 5. This blank is first pressed into the arcuate channel-form shown generally in Fig. 8. Before welding their abutting margins formed on the longitudinal seams, it is first desirable to slope the outer edges of those margins so as to define a channel for the reception of the weld-metal and thus keep the added metal within the limits of the finished devices, thereby producing a smooth surface combined with the requisite strength. This is best effected by bending the margins sharply inward as shown at 6, 6 which both produces an internal stiffening flange and slopes the edge of the bend at 7 so as to produce a groove for the weld-metal 8. As a variation it is equally of our invention to chamfer or bevel the margin as shown at 7ª in Fig. 6. The arcuate hollow bodies thus produced are then assembled end to end in circular fashion and secured rigidly together, preferably by welding. A larger or smaller number of such bodies may be employed in making a mandrel, the device shown in Fig. 1 consisting of four segments and the device shown in Fig. 4 comprising five segments, and each comprising less than 70° so as to produce a discontinuous mandrel as above explained. The joints in the mandrel are preferably reinforced internally for the sake of greater stiffness; and the joints themselves are preferably so formed as to produce a groove for the reception of the weld-metal lower than the surface of the mandrel. In Fig. 9 we have shown the reinforcement as consisting of a circular plate 10 inserted into the ends of the two adjacent hollow bodies, said bodies being spaced apart longitudinally a distance sufficient to define a narrow slot $b$ between them to be filled with the weld-metal, which therefore engages both the body of the mandrel and the plate 10 the whole of its periphery. In Fig. 10 we have shown the reinforcement as consisting of the circular sleeve 11 pressed into the abutting ends of the hollow bodies $b$—$b$, the groove for the reception of the weld metal being provided by chamfering the edges of those bodies as shown at $c$. In Fig. 11 we have shown one of these reinforcements as formed by bending inwardly the abutting ends of the hollow bodies $d$—$d$ forming the integral flanges, and simultaneously by such bending producing the sloping corners $f$—$f$ which produce the grooves. In this case the reinforcement is integral with the body. When a plate 10 is employed as a reinforcement it is preferably formed with one or more apertures 12 so that the heating fluid can penetrate to all portions of the mandrel interior.

After the mandrel has been fully built up it is passed through a pair of finising dies G—G, as shown in Fig. 12, being there subjected to a pressure greater than the elastic limit of the metal, whereby the welding strains are overcome and a uniform regular surface is produced as described and claimed in our application Serial No. 272,412 filed Jan. 22, 1919. For mandrels of complete circular form as shown in Figs. 1 to 3 we prefer to employ a pair of complete circular dies so that all parts of the mandrel can be acted upon at once at the same blow; but for a discontinuous mandrel as shown in Figs. 4, 5, and 6 it is practically as satisfactory to employ a die of comparatively short segmental form and advance the mandrel step by step therethrough during the final operation. Also in the device shown in Fig. 4 it is not imperative that the hollow bodies lie in exactly the same plane since a small amount of twist is not objectionable in the completed inner tube, and in fact a somewhat helical shape of the mandrel considerably facilitates the removal of the cured tube. This helical shape can easily be obtained by attaching the hollow bodies in a slightly progressive angular relation to each other.

It will be understood that many other changes and variations in the particular construction of our improved mandrel could be made within the scope of our invention.

Having thus described our invention, what we claim is:—

1. A mandrel for pneumatic tire manufacture made from a plurality of arcuate hollow bodies welded end to end in circular form, each body consisting of a plurality of arcuate sheet metal channel-pieces assembled together and welded longitudinally, each body being everywhere convex in transverse section.

2. A mandrel for pneumatic tire manufacture made from a plurality of arcuate hollow bodies welded end to end in circular form, each body consisting of a pair of similar arcuate channel-pieces assembled together and welded longitudinally at both edges, each body being everywhere convex in transverse section.

3. A mandrel for pneumatic tire manufacture made from a plurality of arcuate hollow bodies secured together end to end in circular form, each body consisting of a plurality of arcuate channel pieces assembled together, the abutting margins of such pieces being slanted at the outer side to define a groove which is filled with weld-metal whereby the pieces are held together and a smooth exterior secured.

4. A mandrel for pneumatic tire manufacture consisting of a plurality of hollow, arcuate, sheet-metal bodies welded together end to end, there being a reinforcement inside said mandrel at each of such welds and the mandrel being everywhere convex in transverse section.

5. As an article of manufacture, a mandrel for pneumatic tire manufacture made of arcuate pieces of sheet metal welded together at all their margins and the mandrel being everywhere convex in transverse section.

6. As an article of manufacture, a mandrel for pneumatic tire tube manufacture made of pieces of sheet metal welded together in torus shape, said mandrel constituting more than three quarters of a complete circle but less than a complete circle and being everywhere convex in transverse section.

7. A mandrel for pneumatic tire manufacture comprising a plurality of hollow arcuate sheet metal bodies welded together end to end in torus-shape, each of said bodies consisting of a plurality of curvilinear channel-pieces welded together at both margins, there being a weld-seam around the periphery of the torus.

In testimony whereof, we hereunto affix our signatures.

DON A. CLARK.
CLYDE E. LOWE.